June 30, 1936.  F. FALLA  2,045,591

METHOD FOR PREPARING GREEN COFFEE FOR ROASTING

Filed Dec. 27, 1932   2 Sheets-Sheet 1

INVENTOR.
FERNANDO FALLA
BY
ATTORNEY.

June 30, 1936.   F. FALLA   2,045,591
METHOD FOR PREPARING GREEN COFFEE FOR ROASTING
Filed Dec. 27, 1932   2 Sheets-Sheet 2

INVENTOR.
FERNANDO FALLA
BY
ATTORNEY.

Patented June 30, 1936

2,045,591

UNITED STATES PATENT OFFICE 2,045,591

METHOD FOR PREPARING GREEN COFFEE FOR ROASTING

Fernando Falla, Millburn Township,
Essex County, N. J.

Application December 27, 1932, Serial No. 648,875

4 Claims. (Cl. 99—68)

The invention relates to a novel method for preparing the raw coffee bean for roasting, and to apparatus for carrying out the novel method.

It has for an object to provide the raw coffee bean in a crushed or ground condition for roasting; also to afford the raw coffee bean, prior to roasting, in such a form that all matter unsuitable for preparing a beverage from the roasted coffee will be eliminated.

A further object of the invention resides in the provision of mechanism whereby raw unroasted coffee in the aforesaid state may be continuously prepared from the green coffee bean.

In carrying out the invention, the green coffee bean is prepared for roasting in a crushed or ground state; and, prior to the roasting process, it is subjected to a winnowing or like action for the removal of the portion of the so-called "silver skin" or thin tissue or film remaining imprisoned by the bean in its natural state.

The nature of the invention, however, will best be understood when described in connection with the accompanying drawings, in which.

Figure 1:
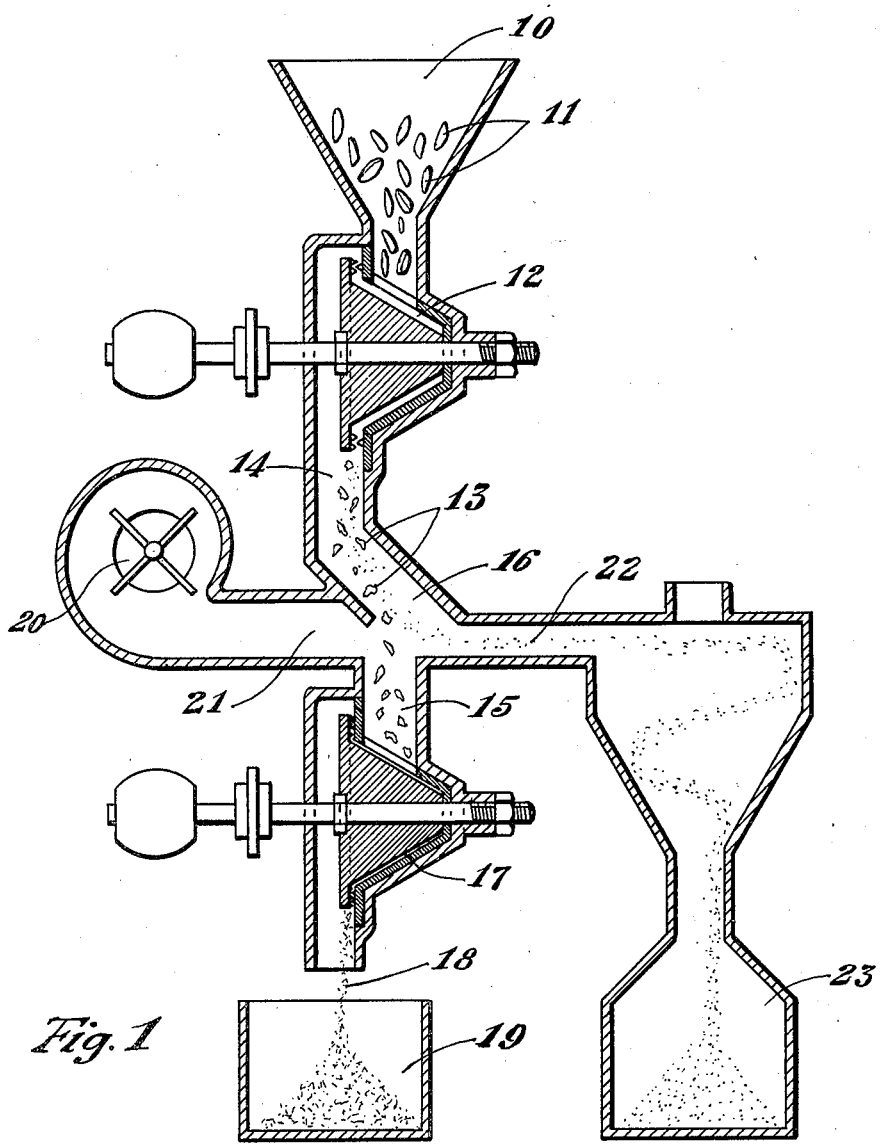
Fig. 1 is a vertical section through apparatus suitable for treating raw coffee beans in the novel manner prior to the roasting thereof.
Figure 2:
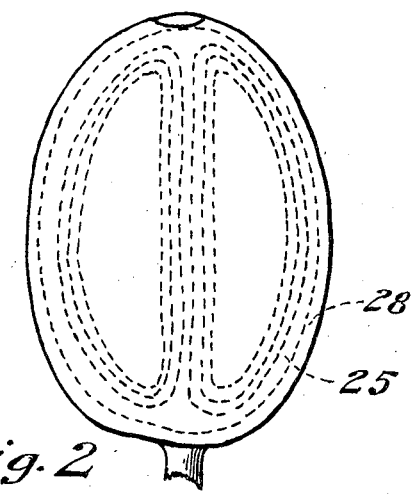
Fig. 2 is a front elevation, on a greatly enlarged scale, of a coffee berry.
Figure 4:
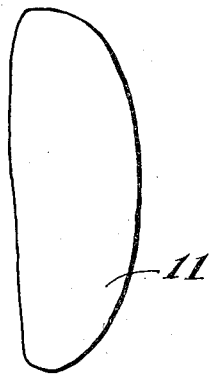
Fig. 4 is a front elevation of one of the coffee beans of a pair comprising the berry shown in Fig. 2.
Figure 3:
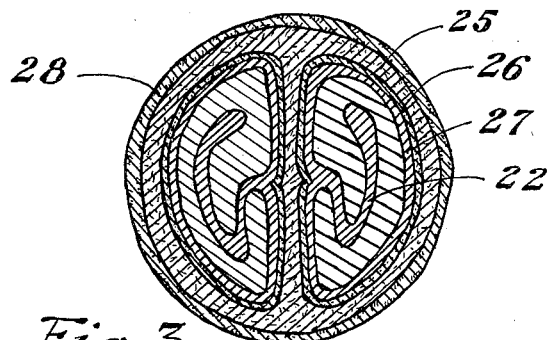
Fig. 3 is a transverse section therethrough.
Figure 5:
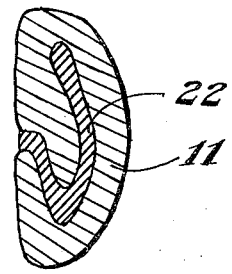
Fig. 5 is a transverse section therethrough.
Figure 6:
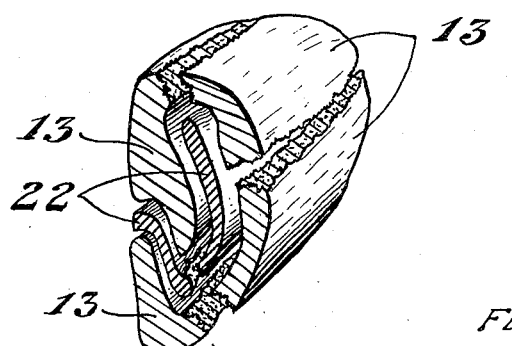
Fig. 6 is a perspective exploded view of a crushed coffee bean.

Referring to the drawings, more particularly Fig. 1 thereof, 10 designates a suitable feed hopper adapted to receive green coffee beans 11, such as are indicated in Fig. 4, the same being delivered by the hopper to suitable crushing mechanism 12 for breaking up the beans into coarse fragments 13, as indicated in Fig. 6. Crusher 12 delivers the fragments of coffee through a chute having an upper portion 14, lower portion 15 and intermediate inclined portion 16. The lower portion 15 affords a delivery chute for suitable grinding apparatus 17 serving to grind the coffee to the desired degree of fineness; and the ground coffee 18 may be delivered therefrom into a bin or other receptacle 19, preparatory to being roasted.

At the intermediate portion 16 of the chute, a stream of air is arranged to be directed substantially at right angles to the flow of the coffee bean fragments between the crushing and grinding apparatus through the chute. This air, for example, may be provided by a suitable fan or blower 20 having the outlet duct 21 directed transversely to the flow of the coffee bean fragments and serves to winnow out therefrom small particles or fragments of the previously imprisoned "silver skin" or tissue 22 of the coffee bean which has been freed therefrom through the crushing action upon the coffee in its passage through the crusher 12. The objectionable material 22 is directed by the flow of air into a receptacle 23 where it collects and from which it may be removed from time to time as it accumulates.

It will thus be observed that the more or less finely ground coffee 18 will then be substantially free from any objectionable matter normally retained by a coffee bean 11.

These beans, in the natural state, occur in pairs, being enclosed in a soft, whitish pulp 25 of the berry with the flat sides of the two beans in juxtaposition. Over each bean, furthermore, is a covering of semi-transparent membrane 26 known as parchment, the so-called "silver skin" 27 being retained within the parchment. However, each bean is more or less wrapped or folded about itself, leaving the portion 22 of the "silver skin" imprisoned and filling the space between the folds.

So long as the bean remains intact, therefore, this portion 22 of the "silver skin" is not accessible and is not removed when the coffee beans are roasted as a whole in the customary manner. This film will thus be roasted along with the coffee beans and introduces objectionable products when coffee is subsequently brewed from the bean.

The various other foreign portions of the berry are removed in the usual manner in the preparation of the coffee beans for roasting. Thus, the pulp 25 and the red outer skin 28 are removed by machinery after the berries have been harvested, then allowed to undergo fermentation and finally washed until the beans are quite clean of the pulp 25. Thereupon, they are dried in the sun or otherwise and the parchment 26 and portion 27 of the "silver skin" then removed by running the beans through a mill under very light pressure which does not crush the beans. This permits the said portion of the "silver skin" to be winnowed out. The beans, as shown in Fig. 4, are then ordinarily roasted, say to 410° F., and ground to the desired degree.

In applicant's process, on the contrary, prior to any roasting operation the naturally dried green beans shown in Fig. 4 are crushed into the coarse fragments 13, Fig. 6, which releases the imprisoned "silver skin" portion 22, rendering it accessible for winnowing out, as hereinbefore set forth. The coarse fragments are ready for roasting, or they may then be further ground to the desired degree of fineness.

In this condition, it is to be noted that the green coffee is particularly suitable for use in apparatus wherein the roasting of the coffee, without access of air thereto, and the brewing of the beverage therefrom, are accomplished in one and the same apparatus, as is more fully set forth in my copending application Serial No. 542,484, filed June 6, 1931. Furthermore, by crushing the coffee beans in the raw state, roasting thereof is more expeditiously accomplished due to the larger surface exposed to the heating medium.

I claim:

1. The method of preparing raw coffee beans for roasting, which comprises disintegrating the raw beans and then separating therefrom substantially all of the imprisoned raw "silver skin" set free.

2. The method of preparing raw coffee beans for roasting, which comprises disintegrating the raw beans, then separating therefrom substantially all of the imprisoned raw "silver skin" set free, and then grinding or pulverizing the coffee fragments to the desired degree of fineness.

3. The method of preparing coffee, which comprises disintegrating the raw coffee beans, then separating therefrom substantially all of the imprisoned raw "silver skin" set free, and then roasting the coffee fragments for subsequent brewing of the coffee.

4. The method of treating raw coffee beans, which comprises coarsely breaking up the raw bean and then winnowing out from substantially all of the raw coffee fragments the imprisoned raw "silver skin" by blowing air through said fragments.

FERNANDO FALLA.